(12) United States Patent
Gillespie et al.

(10) Patent No.: US 6,881,873 B2
(45) Date of Patent: Apr. 19, 2005

(54) HIGH-ACTIVITY ISOMERIZATION CATALYST AND PROCESS

(75) Inventors: Ralph D. Gillespie, Gurnee, IL (US); Michelle J. Cohn, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/717,812

(22) Filed: Nov. 20, 2003

(65) Prior Publication Data

US 2004/0077915 A1 Apr. 22, 2004

Related U.S. Application Data

(62) Division of application No. 09/942,237, filed on Aug. 29, 2001, now Pat. No. 6,706,659.

(51) Int. Cl.[7] ............................. C07C 5/22; C07C 5/13; C10G 15/00; C10G 33/00
(52) U.S. Cl. ...................... 585/477; 585/480; 585/482; 585/734; 585/750; 585/751; 208/46; 208/106; 208/113; 208/133; 208/134; 208/142; 208/143; 208/187; 208/209; 208/254 H
(58) Field of Search .................... 585/477, 480, 585/482, 734, 750, 751; 208/46, 106, 113, 133, 134, 142, 143, 187, 209, 254 H

(56) References Cited

U.S. PATENT DOCUMENTS

| | | | |
|---|---|---|---|
| 2,939,896 A | 6/1960 | Myers .................... 260/683.68 |
| 3,915,845 A | 10/1975 | Antos ......................... 208/139 |
| 4,003,826 A | 1/1977 | Antos ......................... 208/139 |
| 4,024,052 A | 5/1977 | Antos ......................... 208/139 |
| 4,024,077 A | 5/1977 | Engelhard et al. .......... 252/442 |
| 4,087,381 A | 5/1978 | Antos ......................... 252/441 |
| 4,331,822 A | * 5/1982 | Onodera et al. ............ 585/482 |
| 4,485,185 A | * 11/1984 | Onodera et al. .............. 502/71 |
| 4,899,012 A | * 2/1990 | Sachtler et al. ............. 585/482 |
| 4,918,041 A | 4/1990 | Hollstein et al. ............ 502/217 |
| 4,939,110 A | * 7/1990 | Sachtler et al. ................ 502/66 |
| 4,956,519 A | 9/1990 | Hollstein et al. ............ 585/751 |
| 5,019,671 A | 5/1991 | Hsu et al. .................... 585/751 |
| 5,036,035 A | 7/1991 | Baba et al. .................. 502/221 |
| 5,157,199 A | 10/1992 | Soled et al. ................. 585/750 |
| 5,182,247 A | 1/1993 | Kuhlmann et al. .......... 502/217 |
| 5,212,136 A | 5/1993 | Angstadt et al. ............ 502/206 |
| 5,214,017 A | 5/1993 | Angstadt et al. ............ 502/204 |
| 5,310,868 A | 5/1994 | Angstadt et al. ............ 585/721 |
| 5,321,197 A | 6/1994 | Angstadt et al. ............ 585/721 |
| 5,340,465 A | 8/1994 | Gillespie et al. ............ 208/191 |
| 5,491,278 A | 2/1996 | Angstadt et al. ............ 585/731 |

(Continued)

FOREIGN PATENT DOCUMENTS

| | | | | |
|---|---|---|---|---|
| EP | 0 666 109 A1 | 8/1995 | .......... B01J/27/053 |
| EP | 1002579 A1 | 3/2000 | |
| EP | 0983967 A1 | 5/2000 | |
| JP | 61242641 A | 4/1985 | |

OTHER PUBLICATIONS

Patent Abstracts of Japan, vol. 011, No. 089 Mar. 19, 1987 & JP 61 242641 A (Res Assoc Util of Light Oil), Oct. 28, 1986 abstract.
Database WPI Section CH, Week 198649 Derwent Publications Ltd., London, GB, AN 1986–323907 XP002222499 & JP 61 242641 A (Keishitsu Ryubun Shinyoto), Oct. 28, 1986 abstract.

*Primary Examiner*—Mark L. Bell
*Assistant Examiner*—Patricia L. Hailey
(74) *Attorney, Agent, or Firm*—John G. Tolomei; Maryann Maas

(57) ABSTRACT

A catalyst and process is disclosed to selectively upgrade a paraffinic feedstock to obtain an isoparaffin-rich product for blending into gasoline. The catalyst comprises a support of a sulfated oxide or hydroxide of a Group IVB (IUPAC 4) metal, a first component of at least one lanthanide element or yttrium component, which is preferably ytterbium, and at least one platinum-group metal component which is preferably platinum.

5 Claims, 2 Drawing Sheets

U.S. PATENT DOCUMENTS

| | | |
|---|---|---|
| 5,493,067 A | 2/1996 | Angstadt et al. ............ 585/731 |
| 5,629,257 A | 5/1997 | Umansky et al. ........... 502/217 |
| 5,750,459 A * | 5/1998 | Marella et al. ............. 502/304 |
| 5,780,383 A | 7/1998 | Hollstein et al. ........... 502/324 |
| 5,786,294 A | 7/1998 | Sachtler et al. ............ 502/349 |
| 5,831,139 A | 11/1998 | Schmidt et al. ............ 585/315 |
| 5,837,641 A | 11/1998 | Gosling et al. ............. 502/219 |
| 6,180,556 B1 * | 1/2001 | Marella et al. ............. 502/217 |
| 6,184,430 B1 | 2/2001 | Venkatesh et al. .......... 585/750 |
| 6,214,764 B1 | 4/2001 | Gillespie .................... 502/230 |
| 6,320,089 B1 | 11/2001 | Gillespie .................... 585/744 |
| 6,359,179 B1 | 3/2002 | Nemeth et al. ............. 568/387 |
| 6,448,198 B1 | 9/2002 | Szabo et al. ................ 502/217 |
| 6,495,733 B1 | 12/2002 | Peratello et al. ............ 585/743 |
| 6,593,504 B1 | 7/2003 | Bricker et al. ............. 585/470 |
| 2004/0067845 A1 * | 4/2004 | Furuta et al. ............... 502/216 |

* cited by examiner

HIGH-ACTIVITY ISOMERIZATION CATALYST AND PROCESS

CROSS-REFERENCE TO RELATED APPLICATION

This application is a division of our application U.S. application Ser. No. 09/942,237 filed Aug. 29, 2001 now U.S. Pat. No. 6,706,659, which is hereby incorporated by reference in its entirety.

STATEMENT REGARDING FEDERALLY SPONSORED RESEARCH OR DEVELOPMENT

This work was performed under the support of the U.S. Department of Commerce, National Institute of Standards and Technology, Advanced Technology Program, Cooperative Agreement Number 70NANB9H3035. The United States Government has certain rights in this invention.

FIELD OF THE INVENTION

This invention relates to an improved catalytic composite and process for the conversion of hydrocarbons, and more specifically for the selective upgrading of a paraffinic feedstock by isomerization.

BACKGROUND OF THE INVENTION

The widespread removal of lead antiknock additive from gasoline and the rising fuel-quality demands of high-performance internal-combustion engines have compelled petroleum refiners to install new and modified processes for increased "octane," or knock resistance, in the gasoline pool. Refiners have relied on a variety of options to upgrade the gasoline pool, including higher-severity catalytic reforming, higher FCC (fluid catalytic cracking) gasoline octane, isomerization of light naphtha and the use of oxygenated compounds. Such key options as increased reforming severity and higher FCC gasoline octane result in a higher aromatics content of the gasoline pool at the expense of low-octane heavy paraffins.

Refiners are also faced with supplying reformulated gasoline to meet tightened automotive emission standards. Reformulated gasoline differs from the traditional product in having a lower vapor pressure, lower final boiling point, increased content of oxygenates, and lower content of olefins, benzene and aromatics. Benzene content generally is being restricted to 1% or lower, and is limited to 0.8% in U.S. reformulated gasoline. Gasoline aromatics content is likely to be lowered, particularly as distillation end points (usually characterized as the 90% distillation temperature) are lowered, since the high-boiling portion of the gasoline which thereby would be eliminated usually is an aromatics concentrate. Since aromatics have been the principal source of increased gasoline octanes during the recent lead-reduction program, severe restriction of the benzene/aromatics content and high-boiling portion will present refiners with processing problems. These problems have been addressed through such technology as isomerization of light naphtha to increase its octane number, isomerization of butanes as alkylation feedstock, and generation of additional light olefins as feedstock for alkylation and production of oxygenates using FCC and dehydrogenation. This issue often has been addressed by raising the cut point between light and heavy naphtha, increasing the relative quantity of naphtha to an isomerization unit. The performance of light-naphtha isomerization catalysts thus is increasingly important in refinery economics.

U.S. Pat. No. 2,939,896 B1 teaches isomerization of paraffinic hydrocarbons using a catalyst containing platinum, halogen and a sulfate of aluminum, magnesium and/or zirconium deposited on activated alumina. The patent does not disclose additional metal components of the catalyst, however. U.S. Pat. No. 5,036,035 B1 teaches a catalyst, and its use in isomerization, containing sulfated zirconium oxide or hydroxide and a platinum-group metal. The patent teaches that reduction of the platinum-group metal is not favorable.

U.S. Pat. No. 4,918,041 B1, U.S. Pat. No. 4,956,519 B1 and European Patent Application 0 666 109 A1 disclose a sulfated catalyst, and its use in isomerization, comprising an oxide or hydroxide of Group III or Group IV; oxide or hydroxide of Groups V, VI or VII; and oxide or hydroxide of Group VIII; '109 also discloses a component from a list of Group VIII metals and metal combinations.

U.S. Pat. No. 3,915,845 B1 discloses a catalyst and its use comprising a platinum-group metal, Group IVA metal, halogen and lanthanide in an atomic ratio to platinum-group metal of 0.1 to 1.25. U.S. Pat. No. 5,493,067 B1 teaches that isoparaffins and olefins are alkylated by contact with a solid superacid such as sulfated zirconia optionally containing added metals and containing added heteropolyacids or polyoxoanions.

U.S. Pat. No. 5,310,868 B1 and U.S. Pat. No. 5,214,017 B1 teach catalyst compositions containing sulfated and calcined mixtures of (1) a support containing an oxide or hydroxide of a Group IV-A element, (2) an oxide or hydroxide of a Group VI, VII, or VIII metal, (3) an oxide or hydroxide of a Group I-B, II-B, III-A, III-B, IV-A, V-A metal, and (4) a metal of the lanthanide series.

U.S. Pat. No. 5,212,136 B1 discloses a solid super acid catalyst useful in alkylation processes comprising sulfated and calcined mixtures of a support of an oxide or hydroxide of a Group IV-A element, an oxide or hydroxide of molybdenum, and an oxide or hydroxide of a Group I-B, II-B, III-A, III-B, IV-B, V-A or VI-A metal other than molybdenum or a metal of the lanthanide series.

SUMMARY OF THE INVENTION

A purpose of the present invention is to provide an improved catalyst and process for hydrocarbon conversion reactions. Another purpose of the present invention is to provide improved technology to upgrade naphtha to gasoline. A more specific purpose is to provide an improved catalyst and process for the isomerization of light naphtha to obtain a high-octane gasoline component. This invention is based on the discovery that a catalyst containing ytterbium and platinum components provides superior performance and stability in the isomerization of light naphtha to increase its isoparaffin content.

A broad embodiment of the present invention is directed to a catalyst comprising a sulfated support of an oxide or hydroxide of a Group IVB (IUPAC 4) metal, preferably zirconium oxide or hydroxide, at least a first component which is a lanthanide element or yttrium component, and at least a second component being a platinum-group metal component. The first component preferably consists of a single lanthanide-series element or yttrium and the second component preferably consists of a single platinum-group metal. Preferably, the first component is ytterbium and the second component is platinum. The catalyst optionally contains an inorganic-oxide binder, especially alumina.

An additional embodiment of the invention is a method of preparing the catalyst of the invention by sulfating the Group IVB metal oxide or hydroxide, incorporating a first component, a lanthanide element, yttrium, or any mixture thereof, and the second component, a platinum-group metal, and preferably binding the catalyst with a refractory inorganic oxide.

In another aspect, the invention comprises converting hydrocarbons using the catalyst of the invention. In yet another embodiment, the invention comprises the isomerization of isomerizable hydrocarbons using the catalyst of the invention. The hydrocarbons preferably comprise light naphtha which is isomerized to increase its isoparaffin content and octane number as a gasoline blending stock.

These as well as other embodiments will become apparent from the detailed description of the invention.

DETAILED DESCRIPTION OF THE INVENTION

Figure 1:
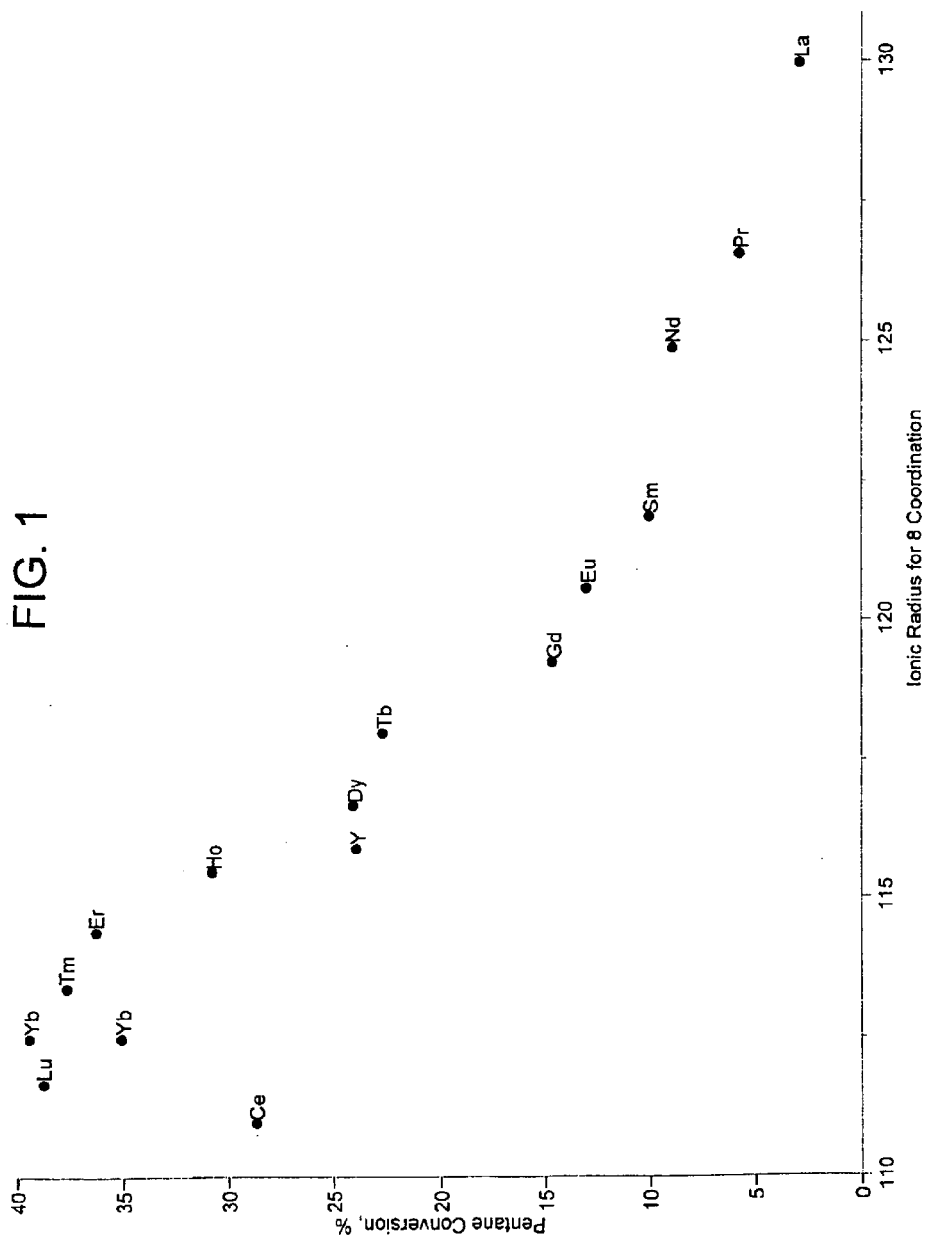
FIG. 1 shows a plot of the percent conversion of pentane versus the ionic radius for 8 coordination of a series of catalysts where the first component of the catalysts was varied.

The support material of the catalyst of the present invention comprises an oxide or hydroxide of a Group IVB (IUPAC 4) metal, see Cotton and Wilkinson, Advanced Inorganic Chemistry, John Wiley & Sons (Fifth Edition, 1988). Preferably, the metal is selected from zirconium and titanium, with zirconium being especially preferred. The preferred zirconium oxide or hydroxide is converted via calcination to crystalline form. Sulfate is composited on the support material to form, it is believed without so limiting the invention, a mixture of Bronsted and Lewis acid sites. A component of a lanthanide-series element is incorporated into the composite by any suitable means. A platinum-group metal component is added to the catalytic composite by any means known in the art to effect the catalyst of the invention, e.g., by impregnation. Optionally, the catalyst is bound with a refractory inorganic oxide. The support, sulfate, metal components and optional binder may be composited in any order effective to prepare a catalyst useful for the isomerization of hydrocarbons.

Production of the support of the present catalyst may be based on a hydroxide of a Group IVB (IUPAC 4) metal as raw material. For example, suitable zirconium hydroxide is available from MEI of Flemington, N.J. Alternatively, the hydroxide may be prepared by hydrolyzing metal oxy-anion compounds, for example $ZrOCl_2$, $ZrO(NO_3)_2$, $ZrO(OH)NO_3$, $ZrOSO_4$, $TiOCl_2$ and the like. Note that commercial $ZrO(OH)_2$ contains a significant amount of HF, about 1 weight percent. Zirconium alkoxides such as zirconyl acetate and zirconium propoxide may be used as well. The hydrolysis can be effected using a hydrolyzing agent such as ammonium hydroxide, sodium hydroxide, potassium hydroxide, sodium sulfate, $(NH_4)_2HPO_4$ and other such compounds known in the art. The metal oxy-anion component may in turn be prepared from available materials, for example, by treating $ZrOCO_3$ with nitric acid. The hydroxide as purchased or generated by hydrolysis preferably is dried at a temperature of from about 100 to 300° C. to vaporize volatile compounds.

A sulfated support is prepared by treatment with a suitable sulfating agent to form a solid strong acid. Liquid acids whose strength is greater than sulfuric acid have been termed "superacids". A number of liquid superacids are known in the literature including substituted protic acids, e.g., trifluoromethyl substituted $H_2SO_4$, triflic acid and protic acids activated by Lewis acids (HF plus $BF_3$). While determination of the acid strength of liquid superacids is relatively straightforward, the exact acid strength of a solid strong acid is difficult to directly measure with any precision because of the less defined nature of the surface state of solids relative to the fully solvated molecules found in liquids. Accordingly, there is no generally applicable correlation between liquid superacids and solid strong acids such that if a liquid super acid is found to catalyze a reaction, there is no corresponding solid strong acid which one can automatically choose to carry out the same reaction. Therefore, as will be used in this specification, "solid strong acids" are those that have an acid strength greater than sulfonic acid resins such as Amberlyst®-15. Additionally, since there is disagreement in the literature whether some of these solid acids are "superacids" only the term solid strong acid as defined above will be used herein. Another way to define a solid strong acid is a solid comprising of interacting protic and Lewis acid sites. Thus, solid strong acids can be a combination of a Bronsted (protonic) acid and a Lewis acid component. In other cases, the Bronsted and Lewis acid components are not readily identified or present as distinct species, yet they meet the above criteria.

Sulfate ion is incorporated into a catalytic composite, for example, by treatment with sulfuric acid in a concentration usually of about 0.01–10N and preferably from about 0.1–5N. Compounds such as hydrogen sulfide, mercaptans or sulfur dioxide, which are capable of forming sulfate ions upon calcining, may be employed as alternative sources. Preferably, ammonium sulfate is employed to provide sulfate ions and form a solid strong acid catalyst. The sulfur content of the finished catalyst generally is in the range of about 0.5 to 5 mass-%, and preferably is from about 1 to 2.5 mass-%. The sulfated composite is dried, preferably followed by calcination at a temperature of about 500 to 700° C. particularly if the sulfation is to be followed by incorporation of the platinum-group metal.

A first component, comprising one or more of the lanthanide-series elements, yttrium, or mixtures thereof, is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium. Preferred lanthanide series elements include lutetium, ytterbium, thulium, erbium, holmium, terbium, and mixtures thereof. Ytterbium is a most preferred component of the present catalyst, and it is especially preferred that the first component consists essentially of a ytterbium component. The first component may in general be present in the catalytic composite in any catalytically available form such as the elemental metal, a compound such as the oxide, hydroxide, halide, oxyhalide, carbonate or nitrate or in chemical combination with one or more of the other ingredients of the catalyst. The first component is preferably an oxide, an intermetallic with platinum, a sulfate, or in the zirconium lattice. The materials are generally calcined between 600 and 800° C. and thus in the oxide form. Although it is not intended to so restrict the present invention, it is believed that best results are obtained when the first component is present in the composite in a form wherein substantially all of the lanthanide or yttrium component is in an oxidation state above that of the elemental state such as in the form of the oxide, oxyhalide or halide or in a mixture thereof and the subsequently described oxidation and reduction steps that are preferably used in the preparation of the instant catalytic composite are specifically designed to achieve this end. The lanthanide element or yttrium component can be incorporated into the catalyst in any amount which is catalytically effective, suitably from about 0.01 to about 10 mass-% lanthanide or yttrium, or mixtures, in the catalyst on an elemental basis. Best results usually are achieved with about 0.5 to about 5 mass-% lanthanide or yttrium, calculated on an elemental basis. The preferred atomic ratio of lanthanide or yttrium to platinum-group metal for this catalyst is at least about 1:1, preferably about 2:1 or greater, and especially about 5:1 or greater.

The first component is incorporated in the catalytic composite in any suitable manner known to the art, such as by coprecipitation, coextrusion with the porous carrier material, or impregnation of the porous carrier material either before, after, or simultaneously with sulfate though not necessarily with equivalent results. For ease of operation, it is preferred to simultaneously incorporate the lanthanide element or yttrium with the sulfate. It is most preferred to incorporate the platinum-group metal component last. As to the lanthanide series element or yttrium and the platinum-group metal, the order between the two does not have a significant impact.

One method of depositing the first component involves impregnating the support with a solution (preferably aqueous) of a decomposable compound of the lanthanide element or elements or yttrium. By decomposable is meant that upon heating, the lanthanide element or yttrium compound is converted to the lanthanide element or yttrium element or oxide with the release of byproducts. Illustrative of the decomposable compounds of the lanthanide elements are suitable lanthanide complexes or compounds such as, nitrates, halides, sulfates, acetates, organic alkyls, hydroxides, and the like compounds. The first component can be impregnated into the carrier either prior to, simultaneously with, or after the platinum-group metal component, although not necessarily with equivalent results.

A second component, a platinum-group metal, is an essential ingredient of the catalyst. The second component comprises at least one of platinum, palladium, ruthenium, rhodium, iridium, or osmium; platinum is preferred, and it is especially preferred that the platinum-group metal consists essentially of platinum. The platinum-group metal component may exist within the final catalytic composite as a compound such as an oxide, sulfide, halide, oxyhalide, etc., in chemical combination with one or more of the other ingredients of the composite or as the metal. Amounts in the range of from about 0.01 to about 2-wt. % platinum-group metal component, on an elemental basis, are preferred. Best results are obtained when substantially all of the platinum-group metal is present in the elemental state.

The second component, a platinum-group metal component, is deposited on the composite using the same means as for the first component described above. Illustrative of the decomposable compounds of the platinum group metals are chloroplatinic acid, ammonium chloroplatinate, bromoplatinic acid, dinitrodiamino platinum, sodium tetranitroplatinate, rhodium trichoride, hexa-amminerhodium chloride, rhodium carbonylchloride, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, ammonium hexachloroiridate (III), ammonium aquohexachloroiridate (IV), ruthenium tetrachloride, hexachlororuthenate, hexa-amminerutheniun chloride, osmium trichloride and ammonium osmium chloride. The second component, a platinum-group component, is deposited on the support either before, after, or simultaneously with sulfate and/or the first component though not necessarily with equivalent results. It is preferred that the platinum-group component is deposited on the support either after or simultaneously with sulfate and/or the first component.

In addition to the first and second components above, the catalyst may optionally further include a third component of iron, cobalt, nickel, rhenium or mixtures thereof. Iron is preferred, and the iron may be present in amounts ranging from about 0.1 to about 5-wt. % on an elemental basis. The third component, such as iron, may function to lower the amount of the first component, such as ytterbium, needed in the optimal formulation. The third component may be deposited on the composite using the same means as for the first and second components as described above. When the third component is iron, suitable compounds would include iron nitrate, iron halides, iron sulfate and any other soluble iron compound.

The catalytic composite described above can be used as a powder or can be formed into any desired shapes such as pills, cakes, extrudates, powders, granules, spheres, etc., and they may be utilized in any particular size. The composite is formed into the particular shape by means well known in the art. In making the various shapes, it may be desirable to mix the composite with a binder. However, it must be emphasized that the catalyst may be made and successfully used without a binder. The binder, when employed, usually comprises from about 0.1 to 50 mass-%, preferably from about 5 to 20 mass-%, of the finished catalyst. The art teaches that any refractory inorganic oxide binder is suitable. One or more of silica, alumina, silica-alumina, magnesia and mixtures thereof are suitable binder materials of the present invention. A preferred binder material is alumina, with eta- and/or especially gamma-alumina being favored. Examples of binders which can be used include but are not limited to alumina, silica, silica-alumina and mixtures thereof. Usually the composite and optional binder are mixed along with a peptizing agent such as HCl, $HNO_3$, KOH, etc. to form a homogeneous mixture which is formed into a desired shape by forming means well known in the art. These forming means include extrusion, spray drying, oil dropping, marumarizing, conical screw mixing, etc. Extrusion means include screw extruders and extrusion presses. The forming means will determine how much water, if any, is added to the mixture. Thus, if extrusion is used, then the mixture should be in the form of a dough, whereas if spray drying or oil dropping is used, then enough water needs to be present in order to form a slurry. These particles are calcined at a temperature of about 260° C. to about 650° C. for a period of about 0.5 to about 2 hours.

The catalytic composites of the present invention either as synthesized or after calcination can be used as catalysts in hydrocarbon conversion processes. Calcination is required to form zirconium oxide from zirconium hydroxide. Hydrocarbon conversion processes are well known in the art and include cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation, ring opening, and syngas shift processes. Specific reaction conditions and the types of feeds, which can be used in these processes, are set forth in U.S. Pat. Nos. 4,310,440 B1 and 4,440,871 B1 which are incorporated by reference. A preferred hydrocarbon conversion process is the isomerization of paraffins.

In a paraffin isomerization process, common naphtha feedstocks boiling within the gasoline range contain paraffins, naphthenes, and aromatics, and may comprise small amounts of olefins. Feedstocks which may be utilized include straight-run naphthas, natural gasoline, synthetic naphthas, thermal gasoline, catalytically cracked gasoline, partially reformed naphthas or raffinates from extraction of aromatics. The feedstock essentially is encompassed by the range of a full-range naphtha, or within the boiling point range of 0° to 230° C. Usually the feedstock is light naphtha having an initial boiling point of about 10° to 65° C. and a final boiling point from about 75° to 110° C.; preferably, the final boiling point is less than about 95° C.

The principal components of the preferred feedstock are alkanes and cycloalkanes having from 4 to 7 carbon atoms per molecule ($C_4$ to $C_7$), especially $C_5$ to $C_6$, and smaller amounts of aromatic and olefinic hydrocarbons also may be present. Usually, the concentration of $C_7$ and heavier components is less than about 20 mass-% of the feedstock. Although there are no specific limits to the total content in the feedstock of cyclic hydrocarbons, the feedstock generally contains between about 2 and 40 mass-% of cyclics comprising naphthenes and aromatics. The aromatics contained in the naphtha feedstock, although generally amounting to less than the alkanes and cycloalkanes, may comprise from 2 to 20 mass-% and more usually from 5 to 10 mass-% of the total. Benzene usually comprises the principal aromatics constituent of the preferred feedstock, optionally along with smaller amounts of toluene and higher-boiling aromatics within the boiling ranges described above.

Contacting within the isomerization zones may be effected using the catalyst in a fixed-bed system, a moving-bed system, a fluidized-bed system, or in a batch-type operation. A fixed-bed system is preferred. The reactants may be contacted with the bed of catalyst particles in either upward, downward, or radial-flow fashion. The reactants may be in the liquid phase, a mixed liquid-vapor phase, or a vapor phase when contacted with the catalyst particles, with excellent results being obtained by application of the present invention to a primarily liquid-phase operation. The isomerization zone may be in a single reactor or in two or more separate reactors with suitable means there between to ensure that the desired isomerization temperature is maintained at the entrance to each zone. Two or more reactors in sequence are preferred to enable improved isomerization through control of individual reactor temperatures and for partial catalyst replacement without a process shutdown.

Isomerization conditions in the isomerization zone include reactor temperatures usually ranging from about 40° to 250° C. Lower reaction temperatures are generally preferred in order to favor equilibrium mixtures having the highest concentration of high-octane highly branched isoalkanes and to minimize cracking of the feed to lighter hydrocarbons. Temperatures in the range of about 100° to about 200° C. are preferred in the process of the present invention. Reactor operating pressures generally range from about 100 kPa to 10 MPa absolute, preferably between about 0.3 and 4 MPa. Liquid hourly space velocities range from about 0.2 to about 25 $hr^{-1}$, with a range of about 0.5 to 15 $hr^{-1}$ being preferred.

Hydrogen is admixed with or remains with the paraffinic feedstock to the isomerization zone to provide a mole ratio of hydrogen to hydrocarbon feed of from about 0.01 to 20, preferably from about 0.05 to 5. The hydrogen may be supplied totally from outside the process or supplemented by hydrogen recycled to the feed after separation from the reactor effluent. Light hydrocarbons and small amounts of inerts such as nitrogen and argon may be present in the hydrogen. Water should be removed from hydrogen supplied from outside the process, preferably by an adsorption system as is known in the art. In a preferred embodiment, the hydrogen to hydrocarbon mol ratio in the reactor effluent is equal to or less than 0.05, generally obviating the need to recycle hydrogen from the reactor effluent to the feed.

Upon contact with the catalyst, at least a portion of the paraffinic feedstock is converted to desired, higher octane, isoparaffin products. The catalyst of the present invention provides the advantages of high activity and improved stability. When the first component is selected to be ytterbium, the catalyst of the present invention has the additional advantage of increased ring opening activity.

The isomerization zone generally also contains a separation section, optimally comprising one or more fractional distillation columns having associated appurtenances and separating lighter components from an isoparaffin-rich product. Optionally, a fractionator may separate an isoparaffin concentrate from a cyclics concentrate with the latter being recycled to a ring-cleavage zone.

Preferably part or all of the isoparaffin-rich product and/or the isoparaffin concentrate are blended into finished gasoline along with other gasoline components from refinery processing including, but not limited to, one or more of butanes, butenes, pentanes, naphtha, catalytic reformate, isomerate, alkylate, polymer, aromatic extract, heavy aromatics, gasoline from catalytic cracking, hydrocracking, thermal cracking, thermal reforming, steam pyrolysis and coking, oxygenates such as methanol, ethanol, propanol, isopropanol, tert-butyl alcohol, sec-butyl alcohol, methyl tertiary butyl ether, ethyl tertiary butyl ether, methyl tertiary amyl ether and higher alcohols and ethers, and small amounts of additives to promote gasoline stability and uniformity, avoid corrosion and weather problems, maintain a clean engine and improve driveability.

The following examples serve to illustrate certain specific embodiments of the present invention. These examples should not, however, be construed as limiting the scope of the invention as set forth in the claims. There are many possible other variations, as those of ordinary skill in the art will recognize, which are within the scope of the invention.

EXAMPLE 1

Catalyst samples of Table 1 were prepared starting with zirconium hydroxide that had been prepared by precipitating zirconyl nitrate with ammonium hydroxide at 65° C. The zirconium hydroxide was dried at 120° C., ground to 40–60 mesh. Multiple discrete portions of the zirconium hydroxide were prepared. Solutions of either ammonium sulfate or a metal salt (component 1) were prepared and added to the portions of zirconium hydroxide. The materials were agitated briefly and then dried with 80–100° C. air while rotating. The impregnated samples were then dried in a muffle oven at 150° C. for two hours under air. Solutions of either ammonium sulfate or a metal salt (component 2, where component 2 is not the same as component 1) were prepared and added to the dried materials. The samples were briefly agitated and dried while rotating. The samples were then calcined at 600–700° C. for 5 hours. The final impregnation solutions of chloroplatinic acid were prepared and added to the solids. The samples were agitated and dried while rotating as before. The samples were finally calcined at 525° C. in air for 2 hours. In Table 1 below, "A" indicates that catalysts were made at modifier levels of 1 wt. %, 2 wt. %, 3 wt. % and 4 wt. %; "B" indicates that catalysts were made at sulfate levels of 6 wt. %, 7 wt. %, and 8 wt. %; and "C" indicates that catalysts were made at platinum levels of 0.25 wt. %, 0.5 wt. %, 0.75 wt. %, and 1 wt. %.

TABLE 1

| Modifier | Modifier Level | Fe | Pt | $SO_4$ |
|---|---|---|---|---|
| Ce | A | 0 | 0.4 | 7 |
| Dy | A | 0 | 0.4 | 7 |
| Er | A | 0 | 0.4 | 7 |
| Eu | A | 0 | 0.4 | 7 |
| Gd | A | 0 | 0.4 | 7 |
| Ho | A | 0 | 0.4 | 7 |
| La | A | 0 | 0.4 | 7 |
| Lu | A | 0 | 0.4 | 7 |
| Nd | A | 0 | 0.4 | 7 |
| Pr | A | 0 | 0.4 | 7 |
| Sm | A | 0 | 0.4 | 7 |
| Tb | A | 0 | 0.4 | 7 |
| Tm | A | 0 | 0.4 | 7 |
| Y | A | 0 | 0.4 | 7 |
| Yb | 0.3 | 0 | 0.3 | 7 |
| Yb | 0.4 | 0 | 0.4 | 7 |
| Yb | 0.5 | 0 | 0.5 | 7 |
| Yb | 1 | 0 | 0.4 | 7 |
| Yb | 1 | 0 | C | B |
| Yb | 1.8 | 0 | C | B |
| Yb | 2 | 0 | 0.4 | 7 |
| Yb | 2.7 | 0 | C | B |
| Yb | 3 | 0 | 0.375 | 7 |
| Yb | 3 | 0 | 0.4 | 7 |
| Yb | 3.5 | 0 | C | B |
| Yb | 4 | 0 | 0.4 | 7 |
| Ce | 1 | 1 | 0.4 | 7 |
| Ce | 1 | 1.5 | 0.4 | 7 |
| Yb | 1 | 1.5 | 0.4 | 7 |
| Yb | 1 | 2 | 0.4 | 7 |

EXAMPLE 2

Catalysts were prepared as described in Example 1 containing 2 wt. % modifier, 0.4-wt. % platinum, and 7-wt. % sulfate. Approximately 95 mg of each sample was loaded into a multi-unit reactor assay. The catalysts were pretreated in air at 450° C. for 2–6 hours and reduced at 200° C. in $H_2$ for 0.5–2 hours. 8 wt. % pentane in hydrogen was then passed over the samples at 150° C., approximately 1 atm, and 2.5 $hr^{-1}$ WHSV (based on pentane only). The products were analyzed using online gas chromatographs and the results are shown in FIG. 1, note that a replicate of the ytterbium-containing catalyst was tested. FIG. 1 is a plot of percent pentane conversion vs. the ionic radii for 8 coordination of the lanthanide series or yttrium materials used to modify a platinum sulfated zirconia catalyst. The ionic radii were determined by reference to Huheey, J. E. Inorganic Chemistry—Principles of Structure and Reactivity, 2nd Ed.; Harper & Row: New York, 1978. The plot shows a maximum conversion around 112 picometers (ytterbium). The activity drops off rapidly as the ionic radius increases above approximately 115 picometers.

EXAMPLE 3

Figure 2:
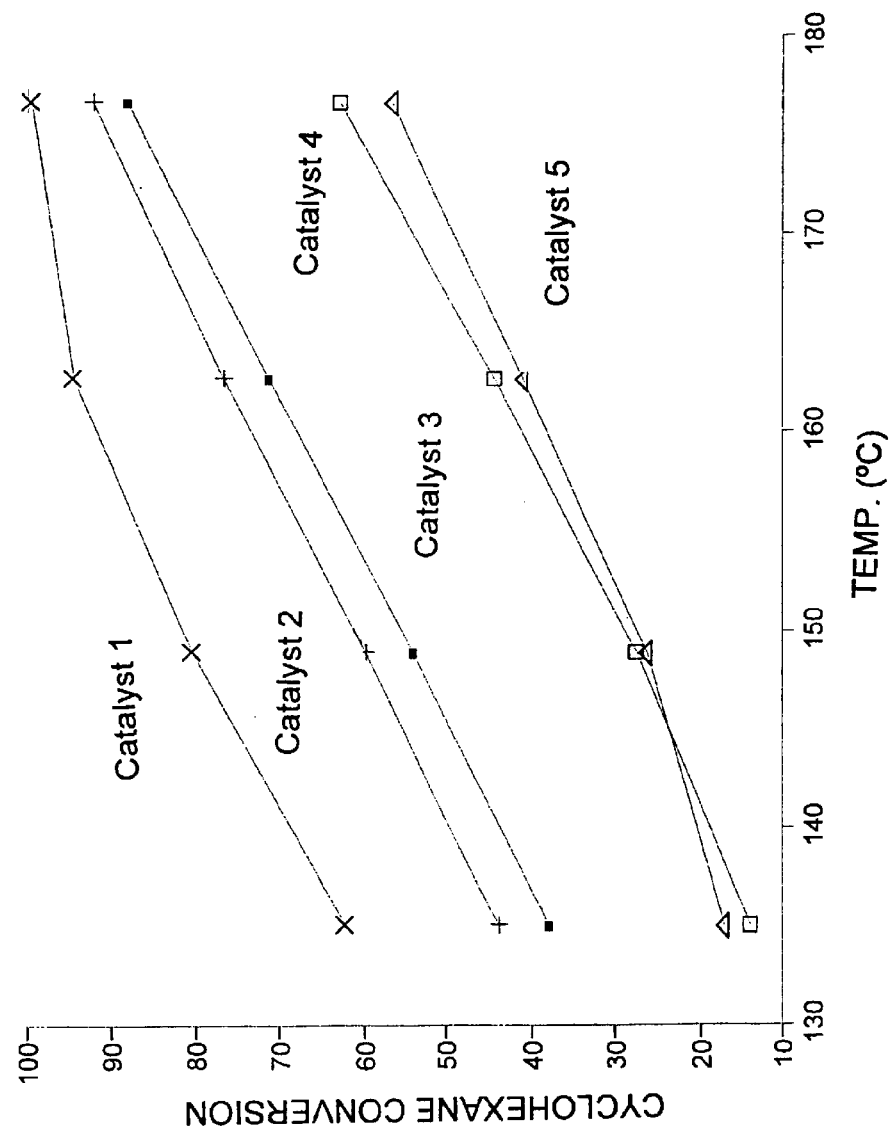
FIG. 2 shows a plot of the cyclohexane conversation versus temperature of a series of catalysts. Catalysts of the present invention are compared to reference catalysts.

Catalysts were prepared as described in Example 1, with the first catalyst (Catalyst 1 in FIG. 2) containing 3 wt. % ytterbium, about 0.375 to about 0.4 wt. % platinum, and 7 wt. % sulfate; the second catalyst (Catalyst 2 in FIG. 2) containing 1 wt. % ytterbium, about 0.375 to about 0.4 wt % platinum, 1 wt. % iron, and 6 wt. % sulfate, and the third catalyst (Catalyst 3 in FIG. 2) containing 0.5 wt. % manganese, 1 wt. % iron, about 0.375 to about 0.4 wt % platinum and 7 wt. % sulfate. Additionally, two reference catalysts were obtained, the first reference catalyst containing platinum on sulfated zirconia (Catalyst 4 in FIG. 2), and the second reference catalyst containing platinum, iron, and manganese on sulfated zirconia (Catalyst 5 in FIG. 2). Approximately 10.5 g of each sample was loaded into a multi-unit reactor assay. The catalysts were pretreated in air at 450° C. for 2–6 hours and reduced at 200° C. in H2 for 0.5–2 hours. Hydrogen and a feed stream containing 36 wt. % n-pentane, 52 wt. % n-hexane, 10 wt. % cyclohexane and 2 wt. % n-heptane was passed over the catalysts at 135° C., 150° C., 163° C., and 176° C., at approximately 450 psig, and 2 $hr^{-1}$ WHSV. The hydrogen to hydrocarbon molar ratio was 1.3. The products were analyzed using online gas chromatographs and the percent conversion of cyclohexane was determined at the different temperatures. The results are shown in FIG. 2 which shows that significant ring opening capability was demonstrated by the platinum and ytterbium on sulfated zirconia catalyst.

What is claimed is:

1. A process for converting hydrocarbons comprising: contacting a feed with a solid acid catalyst, comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof, to give a converted product wherein the atomic ratio of the first component to the second component is at least about 2.

2. The process of claim 1 wherein the hydrocarbon conversion process is selected from the group consisting of cracking, hydrocracking, aromatic alkylation, isoparaffin alkylation, isomerization, polymerization, reforming, dewaxing, hydrogenation, dehydrogenation, transalkylation, dealkylation, hydration, dehydration, hydrotreating, hydrodenitrogenation, hydrodesulfurization, methanation, ring opening, and syngas shift.

3. The process of claim 1 wherein the catalyst further comprises from about 2 to about 50 mass-% of a refractory inorganic-oxide binder.

4. The process of claim 3 wherein the refractory inorganic-oxide binder comprises alumina.

5. The process of claim 1 wherein the first component consists essentially of one single lanthanide element component or a yttrium component, and the second component consists essentially of one single metal selected from the platinum-group metals.

* * * * *